(12) United States Patent
Martins Andrade et al.

(10) Patent No.: US 12,518,484 B2
(45) Date of Patent: Jan. 6, 2026

(54) COLLABORATIVE VIRTUAL REALITY SYSTEM

(71) Applicant: BRITISH TELECOMMUNICATIONS PUBLIC LIMITED COMPANY, London (GB)

(72) Inventors: Tiago Martins Andrade, London (GB); Alexander Healing, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 156 days.

(21) Appl. No.: 18/683,381

(22) PCT Filed: Jul. 29, 2022

(86) PCT No.: PCT/EP2022/071366
§ 371 (c)(1),
(2) Date: Feb. 13, 2024

(87) PCT Pub. No.: WO2023/020811
PCT Pub. Date: Feb. 23, 2023

(65) Prior Publication Data
US 2024/0428512 A1    Dec. 26, 2024

(30) Foreign Application Priority Data

Aug. 19, 2021  (GB) ...................... 2111902

(51) Int. Cl.
*G06T 17/00*  (2006.01)
(52) U.S. Cl.
CPC ................... *G06T 17/00* (2013.01)
(58) Field of Classification Search
CPC ................. G06T 17/00; G06F 3/011
See application file for complete search history.

(56) References Cited

U.S. PATENT DOCUMENTS

| 6,154,723 A | 11/2000 | Cox |
| 7,080,326 B2 | 7/2006 | Molander |

(Continued)

FOREIGN PATENT DOCUMENTS

| EP | 2259225 A1 | 12/2010 |
| EP | 3729248 A1 | 10/2020 |
| WO | 2019119053 A1 | 6/2019 |

OTHER PUBLICATIONS

International Preliminary Report on Patentability and Written Opinion of the International Searching Authority mailed Feb. 29, 2024, issued for International Application No. PCT/EP2022/071366 (9 pages).

(Continued)

*Primary Examiner* — Maurice L. McDowell, Jr.
(74) *Attorney, Agent, or Firm* — Nixon & Vanderhye P.C.

(57) ABSTRACT

A computer-implemented method for use in configuring a collaborative virtual reality (VR) system. The method comprises obtaining first and second environmental data representative of at least one characteristic of a first and second environment associated with a first and second VR system of the collaborative VR system, respectively. First and second capability data representative of a display capability of the first and second VR system for displaying VR content, respectively, is obtained. A common virtual workspace of a VR environment for display of collaborative VR content by both the first VR system and the second VR system is determined, based on the first and second environmental data and the first and second capability data. A first and second layout of at least one display element of the collaborative VR content within the common virtual workspace is determined, for use by the first and second VR system, respectively.

25 Claims, 5 Drawing Sheets

(56) References Cited

U.S. PATENT DOCUMENTS

| | | |
|---|---|---|
| 8,856,670 B1 | 10/2014 | Thakur |
| 10,481,751 B2 | 11/2019 | Sharon |
| 10,854,004 B2 | 12/2020 | Stahl |
| 2013/0293468 A1 | 11/2013 | Perez |
| 2014/0368537 A1 | 12/2014 | Salter |
| 2016/0093108 A1 | 3/2016 | Mao |
| 2016/0188585 A1 | 6/2016 | Durham |
| 2018/0018933 A1* | 1/2018 | Rehmeyer ............ G02B 27/017 |
| 2018/0063205 A1 | 3/2018 | French |
| 2018/0157377 A1 | 6/2018 | Popov |
| 2018/0330542 A1* | 11/2018 | Bharti ................ G02B 27/0172 |
| 2019/0121522 A1 | 4/2019 | Davis |
| 2019/0139320 A1* | 5/2019 | Davies .................... G06T 19/20 |
| 2019/0310761 A1 | 10/2019 | Agarawala |
| 2019/0313059 A1 | 10/2019 | Agarawala |
| 2020/0019418 A1 | 1/2020 | P K |
| 2020/0341779 A1 | 10/2020 | Rohde |
| 2020/0401362 A1 | 12/2020 | Prins |
| 2021/0090315 A1* | 3/2021 | Gladkov ............. G06F 9/45512 |
| 2021/0227178 A1 | 7/2021 | Lyon |
| 2021/0232374 A1 | 7/2021 | Weibel |
| 2023/0031290 A1* | 2/2023 | Little ................. H04L 12/1827 |

OTHER PUBLICATIONS

International Search Report and Written Opinion of the ISA for PCT/EP2022/071366, mailed Nov. 4, 2022, 15 pages.

Combined Search and Examination Report for GB2111902 9, dated Jun. 9, 2022, 12 pages.

Benjamin Lee et al., "Shared Surfaces and Spaces: Collaborative Data Visualisation in a Co-located Immersive Environment", IEEE Transactions on Visualization and Computer Graphics, vol. 27, No. 2, 2021, pp. 1-11.

Zhenyi He et al., "CollaboVR: A Reconfigurable Framework for Creative Collaboration in Virtual Reality", IEEE International Symposium on Mixed and Augmented Reality (ISMAR), 2020, pp. 542-554.

Zac Murez et al., "Atlas: End-to-End 3D Scene Reconstruction from Posed Images", 2020, ArXiv abs/2003.10432, 18 pages.

F.O. Isinkaye et al, "Recommendation systems: Principles, methods and evaluation", Egyptian Informatics Journal, vol. 16, Issue 3, 2015, pp. 261-273.

Christof Lutteroth et al., "Domain Specific High-Level Constraints for User Interface Layout", Constraints, vol. 13, 2008, pp. 307-342.

* cited by examiner

COLLABORATIVE VIRTUAL REALITY SYSTEM

CROSS-REFERENCE TO RELATED APPLICATIONS

This application is the U.S. national phase of International Application No. PCT/EP2022/071366 filed Jul. 29, 2022, which designated the U.S. and claims priority to GB 2111902.9 filed Aug. 19, 2021, the entire contents of each of which are hereby incorporated by reference.

TECHNICAL FIELD

The present invention relates to a collaborative virtual reality (VR) system.

BACKGROUND

Immersion is a cognitive perception that tricks the user into thinking of a virtual world as the real world. It can be triggered when the user is performing tactile operations that involve skill, mental challenge (like puzzle games), is invested in a story and/or when a virtual world is perceptually convincing. Virtual reality (VR) can be used to surround a user with images, objects, sounds, haptic and tactile perceptions, and even odour perceptions, in order to achieve immersion.

VR makes different cognitive interactions possible in a computer-generated environment, which typically models a three-dimensional (3D) virtual space or virtual world. In some cases, VR involves the use of a head-mounted display (HMD) to allow the user to visualise the virtual world. A VR system such as an HMD can also enable the user to navigate within the virtual world, manipulate virtual objects and perform a series of actions within the virtual world while perceiving the effects of those actions.

It is desirable to be able to appropriately configure a collaborative VR system to allow for collaboration between users of different VR systems of the collaborative VR system.

SUMMARY

According to a first aspect of the present disclosure, there is provided a computer-implemented method for use in configuring a collaborative virtual reality (VR) system, the method comprising: obtaining first environmental data representative of at least one characteristic of a first environment associated with a first VR system of the collaborative VR system; obtaining first capability data representative of a display capability of the first VR system for displaying VR content; obtaining second environmental data representative of at least one characteristic of a second environment associated with a second VR system of the collaborative VR system; obtaining second capability data representative of a display capability of the second VR system for displaying VR content; determining, based on the first environmental data, the second environmental data, the first capability data, and the second capability data, a common virtual workspace of a VR environment for display of collaborative VR content by both the first VR system and the second VR system; determining a first layout of at least one display element of the collaborative VR content within the common virtual workspace, for use by the first VR system; determining a second layout of the at least one display element within the common virtual workspace, for use by the second VR system; providing first instructions to the first VR system to configure the first VR system to use the first layout for the at least one display element; and providing second instructions to the second VR system to configure the second VR system to use the second layout for the at least one display element.

In some examples, the first environment is different from the second environment.

In some examples, the first environment is a first physical environment of the first VR system and the second environment is a second physical environment of the second VR system. In some of these examples, the first environmental data is indicative of a position of at least one object within the first physical environment, the second environmental data is indicative of a position of at least one object within the second physical environment, and determining the common virtual workspace comprises determining the common virtual workspace in relation to the position of the at least one object within the first physical environment and the position of the at least one object within the second physical environment. Determining the common virtual workspace may comprise determining the common virtual workspace based on a first free space area defined in relation to the position of the at least one object within the first physical environment, and a second free space area defined in relation to the position of the at least one further object within the second physical environment. In some of these examples, the at least one object within the first physical environment comprises a first object, the at least one object within the second physical environment comprises a second object corresponding to the first object, determining the first layout comprises determining a first position of a display element of the at least one display element within the common virtual workspace to align with a position of the first object within the first physical environment and determining the second layout comprises determining a second position of the display element to align with a position of the second object within the second physical environment.

In some of these examples, the first layout and the second layout are jointly determined, based on the first environmental data, the second environmental data, the first capability data, and the second capability data.

In some of these examples, determining the common virtual workspace comprises: determining, based on the first environmental data and the first capability data, a first virtual workspace of the VR environment for display of the collaborative VR content by the first VR system; determining, based on the second environmental data and the second capability data, a second virtual workspace of the VR environment for display of the collaborative VR content by the second VR system; and determining the common virtual workspace based on the first virtual workspace and the second virtual workspace. The common virtual workspace may correspond to an area of overlap between the first virtual workspace and the second virtual workspace. In some of these examples, the common virtual workspace corresponds to at least one of: less than all of the first virtual workspace displayable by the first VR system, and less than all of the second virtual workspace displayable by the second VR system. In some of these examples, determining the common virtual workspace comprises processing input data comprising first workspace data representative of the first virtual workspace and second workspace data representative of the second virtual workspace using a trained machine learning (ML) system to generate output data indicative of the common virtual workspace. In some of the examples in which input data is processed, the input data comprises display data indicative of the at least one display element, the first layout and the second layout are determined by processing the input data using the trained ML system, and the output data is further indicative of the first layout and the second layout.

In some examples, the first capability data is representative of a first field of view of the first VR system for displaying VR content and the second capability data is representative of a second field of view of the second VR system for displaying VR content.

In some examples, the first layout is the same as the second layout.

In some examples, the first VR system is a different type of VR system than the second VR system.

In some examples, determining the first layout comprises determining the first layout based on characteristic data indicative of a characteristic of the at least one display element and determining the second layout comprises determining the second layout based on the characteristic data.

In some examples, determining the first layout comprises determining the first layout based on interaction data indicative of prior user interactions with prior collaborative VR content displayed using the collaborative VR system and determining the second layout comprises determining the second layout based on the interaction data.

In some examples, the method further comprises: in response to the first VR system receiving the first instructions, the first VR system using the first layout for the at least one display element; and in response to the second VR system receiving the second instructions, the second VR system using the second layout for the at least one display element.

In some examples, the method further comprises: after providing the instructions to the first VR system and providing the instructions to the second VR system, receiving further display data representative of a further display element of the collaborative VR content; determining a further first layout of the further display element within the common virtual workspace, for use by the first VR system; and determining a further second layout of the further display element within the common virtual workspace, for use by the second VR system; providing further first instructions to the first VR system to configure the first VR system to use the further first layout for the further display element; and providing further second instructions to the second VR system to configure the second VR system to use the further second layout for the further display element.

According to a second aspect of the present disclosure, there is provided a computer system comprising: at least one processor; and storage comprising computer program instructions which, when processed by the at least one processor, cause the computer system to: obtain first environmental data representative of at least one characteristic of a first environment associated with a first VR system of a collaborative VR system; obtain first capability data representative of a display capability of the first VR system for displaying VR content; obtain second environmental data representative of at least one characteristic of a second environment associated with a second VR system of the collaborative VR system; obtain second capability data representative of a display capability of the second VR system for displaying VR content; determine, based on the first environmental data, the second environmental data, the first capability data, and the second capability data, a common virtual workspace of a VR environment for display of collaborative VR content by both the first VR system and the second VR system; determine a first layout of at least one display element of the collaborative VR content within the common virtual workspace, for use by the first VR system; determine a second layout of the at least one display element within the common virtual workspace, for use by the second VR system; provide first instructions to the first VR system to configure the first VR system to use the first layout for the at least one display element; and provide second instructions to the second VR system to configure the second VR system to use the second layout for the at least one display element.

In some of these examples, the first environmental data and the first capability data are obtained from the first VR system via a network, and the second environmental data and the second capability data are obtained from the second VR system via the network or a further network.

In some of these examples, to determine the common virtual workspace, the computer program instructions, when processed by the at least one processor, cause the computer system to: determine, based on the first environmental data and the first capability data, a first virtual workspace of the VR environment for display of the collaborative VR content by the first VR system; determine, based on the second environmental data and the second capability data, a second virtual workspace of the VR environment for display of the collaborative VR content by the second VR system; and determine the common virtual workspace based on the first virtual workspace and the second virtual workspace. The common virtual workspace may correspond to an area of overlap between the first virtual workspace and the second virtual workspace. In some of these examples, to determine the common virtual workspace, the computer program instructions, when processed by the at least one processor, cause the computer system to process input data comprising first workspace data representative of the first virtual workspace and second workspace data representative of the second virtual workspace using a trained machine learning (ML) system to generate output data indicative of the common virtual workspace.

According to a third aspect of the present disclosure, there is provided a network comprising the computer system according to any example in accordance with the second aspect of the present disclosure, the first VR system and the second VR system.

BRIEF DESCRIPTION OF THE DRAWINGS

For a better understanding of the present disclosure, reference will now be made by way of example only to the accompany drawings, in which.

DETAILED DESCRIPTION

Apparatus and methods in accordance with the present disclosure are described herein with reference to particular examples. The invention is not, however, limited to such examples.

Examples herein relate to configuration of a collaborative VR system. A collaborative VR system for example includes a plurality of VR systems, which can be used by different users in order to experience the same virtual environment. Actions performed by one user affect the virtual environment experienced by that user as well as each of the other users of the collaborative VR system. For example, if first user moves a virtual object within the virtual environment, the virtual object will appear to move in a corresponding manner in the virtual environment displayed to each of the other users. Examples herein relate to determining a suitable layout of display elements (such as virtual objects) within the virtual environment to aid collaboration between users of the collaborative VR system.

A particular challenge in configuring a collaborative VR system is that different users may be using different VR systems, which may be of a different type to each other, e.g. with different hardware and/or software. For example, one user may be using a VR HMD, and another user may be using a multi-projected environment (which is e.g. formed by a collection of display screens surrounding the user). This increases the potential for there to be a mismatch between the view of a virtual environment experienced by different users, unless the collaborative VR system is appropriately configured (as it is in the examples herein).

Moreover, different VR systems may be associated with different environments, which can further complicate the configuration of the collaborative VR system. For example, different VR systems may be located in different physical environments. If the physical environment of a given VR system is not appropriately accounted for, VR content may be displayed in an appropriate or inaccessible position within the virtual environment, e.g. so that the user of the VR system is unable to interact with the VR content without physically encountering real, physical objects within their physical environment. As an example, the VR system may allow a user to interact with a display element of VR content (such as a virtual object) using a physical gesture. In this example, if the user perceives the display element to be located at a distance from them which exceeds a distance at which a real object is located within their physical environment, the user may encounter the real object if they attempt to perform the physical gesture to interact with the display element. The user may hence hurt themselves, e.g. if, in trying to perform the physical gesture, the user strikes their hand against the real object (such as a wall or desk). Similarly, if the virtual environment displayed by a given VR system is not properly accounted for, VR content may be displayed in an unnatural position within the virtual environment (e.g. misaligned with or partly overlapped or intersected by other virtual objects in the virtual environment). This can make it difficult for the user to interact with the VR content in a natural manner.

To address these issues, examples herein involve determining a common virtual workspace of a VR environment for display of collaborative VR content by both a first and second VR system, based on first and second environmental data representative of at least one characteristic of first and second environments associated with the first and second VR systems and first and second capability data representative of a display capability of the first and second VR systems. This approach allows both the display capabilities and environments associated with the first and second VR systems (e.g. the physical and/or virtual environments associated with the first and second VR systems) to be accounted for in determining the common virtual workspace, so that the common virtual workspace is suitable for the display of the collaborative VR content by both the first and second VR systems. A layout of a display element within the common virtual workspace can then be determined for each of the first and second VR systems.

For example, if the first and second VR systems are each VR devices (such as HMDs), the field of view of each device may differ appreciably between each device. By accounting for this difference in field of view, a suitable layout of the display element for each of the first and second VR devices can be determined which is within the common virtual workspace, which is for example within the field of view of each of the first and second VR devices. In contrast, if the display capabilities are not properly accounted for, the display element may be displayed in an inappropriate position for at least one of the VR systems, e.g. so it is not visible or is in a periphery of the user's vision rather than in a more central region. However, by configuring a layout of the display element according to the examples herein, the users of each of the first and second VR systems can for example view the display element without having to move artificially within the virtual environment, e.g. without using VR locomotion methods, which effectively allow a user to teleport or otherwise jump to from viewing one location to viewing another (previously invisible) location within the virtual environment.

Moreover, with the approaches herein, a suitable common virtual workspace that accounts for the constraints of the environments associated with each of the first and second VR systems can be determined, which can facilitate safe and/or natural interaction with the collaborative VR system. For example, the common virtual workspace can be determined such that users of the first and second VR systems can interact with VR content displayed within the common virtual workspace without encountering physical objects within their environment.

Figure 1:
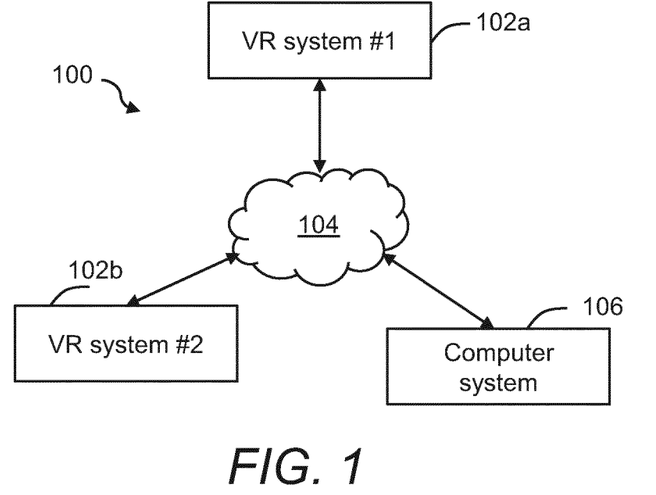
FIG. 1 shows schematically a system including a collaborative VR system according to examples.

FIG. 1 shows schematically a system 100 including a collaborative VR system according to examples. The collaborative VR system of FIG. 1 includes a first VR system 102a and a second VR system 102b. However, in other examples, a collaborative VR system may include more than two VR systems. A VR system is a system (which may be a single device or may include a plurality of devices in communication with each other) which is capable of displaying VR content, which is for example virtual content within a virtual environment. The first and second VR systems 102a, 102b are connected to a network 104, which may be a single network or may include a plurality of networks. The network to which first and second VR systems such as this are connected may be or include a wide area network (WAN), a local area network (LAN) and/or the Internet, and may be a personal or enterprise network. In FIG. 1, however, the network 104 is the Internet.

A computer system 106 is also connected to the network 104. In this example, the computer system 106 obtains first and second environmental data representative of at least one characteristic of first and second environments associated with the first and second VR systems 102a, 102b and first and second capability data representative of a display capability of the first and second VR systems 102a, 102b. The first environmental data and the first capability data may be sent from the first VR system 102a to the computer system 106, via the network 104, or at least one of the first environmental data and the first capability data may be obtained in a different manner by the computer system 106. For example, the first environmental data may be received from the first VR system 102a and the first capability data may be retrieved from a look-up table stored at the computer system 106 or a further computer system and including display capabilities of various different VR systems (e.g. obtained from manufacturers of respective VR systems). Similarly, the second environmental data and the second capability data may be sent from the second VR system 102b to the computer system 106, via the network 104, or at least one of the second environmental data and the second capability data may be obtained in a different manner by the computer system 106.

The computer system 106 then uses the first and second environmental data and the first and second capability data to determine a common virtual workspace of a VR environment. The computer system 106 also determines first and second layouts of at least one display element of collaborative VR content to be displayed within the common virtual workspace by the first and second VR systems 102a, 102b, and sends first and second instructions to the first and second VR systems 102a, 102b, in this case via the network 104, to configure the first and second VR systems 102a, 102b to use the first and second layouts, respectively. In response to receiving the first and second instructions, the first and second VR systems 102a, 102b display the VR content according to the first and second layouts, i.e. with the first layout used by the first VR system 102a for the at least one display element and the second layout used by the second VR system 102b for the at least one display element.

Figure 2:
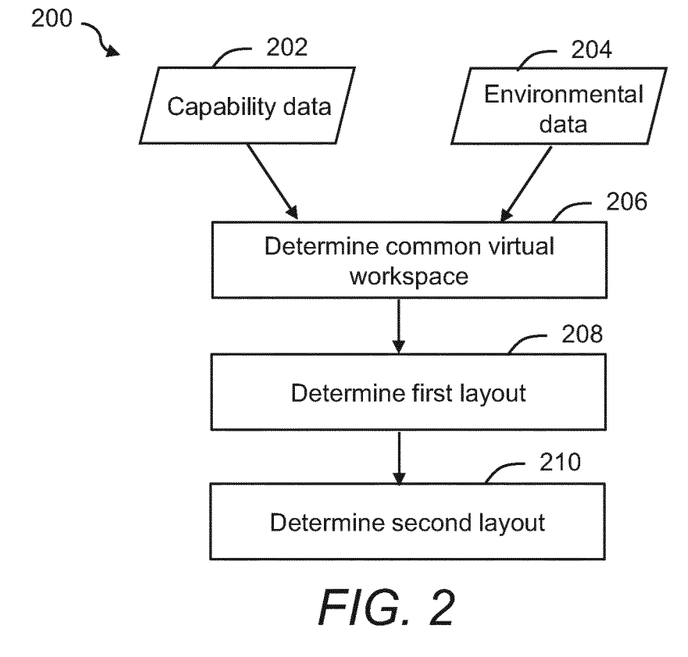
FIG. 2 is a flow diagram of a method for use in configuring a collaborative VR system according to examples.

FIG. 2 is a flow diagram of a method 200 for use in configuring a collaborative VR system according to examples. The method 200 of FIG. 2 may for example be performed by the computer system 106 of FIG. 1.

The method 200 of FIG. 2 involves obtaining first and second capability data representative of a display capability of first and second VR systems of the collaborative VR system, which may be the same as or similar to the first and second VR systems 102a, 102b of FIG. 1. The first and second capability data are shown collectively in FIG. 2 as capability data 202. For a given VR system (such as the first or second VR system), the capability data for example represents a property of the VR system affecting or otherwise constraining how content is displayed or is displayable by the VR system. For example, the capability data may represent:

a field of view of the VR system, which is e.g. the extent of a virtual environment which is observable by a user of the VR system;

a resolution of the VR system, which is e.g. indicative of the number of pixels of a display device of the VR system;

a control interface of the VR system, which e.g. allows a user of the VR system to control how content is displayed by the VR system. In such cases, the capability data may for example indicate the number and/or type of controllers of the control interface, which are useable to control the VR system;

a make, model or type of the VR system, which may e.g. act as a proxy for other display capabilities of the VR system.

The method 200 of FIG. 2 also involves obtaining first and second environmental data representative of at least one characteristic of first and second environments associated with the first and second VR systems, respectively. The first and second environmental data are shown collectively in FIG. 2 as environmental data 204. The at least one characteristic of a given environment may be represented in any suitable manner. For example, environmental data for a given physical environment of a VR system may be in the form of, comprise or be based on:

image data representing an image of the physical environment, which may be obtained using a camera of or associated with the VR system;

video data representing video of the physical environment, which may be obtained using a video camera of or associated with the VR system;

a computer-generated map of the physical environment. Such a map may be or include a depth map, indicating a depth between a plane associated with the VR system and a closest surface within the physical environment. In some cases, the map may be obtained using mapping techniques such as simultaneous localisation and mapping (SLAM), in which data representing the environment (such as image data or video data discussed above, depth data obtained using a depth sensor of or associated with the VR system, and/or motion data obtained using a motion sensor of or associated with the VR system) is processed to construct or update the map of the physical environment while simultaneously tracking a position of the VR system within the physical environment. The map may further include semantic information indicative of an identified type or identity of objects within the physical environment. For example, the map may include regions identified as being representative of a particular type of object, such as a chair or table, within the physical environment feature data representing features of landmarks of the physical environment. Feature data such as this may for example represent feature vectors indicative of features of keypoints of an image of the physical environment, which are e.g. distinctive image regions.

Environmental data for a given virtual environment of VR system may similarly be, comprise or be based on a map or other representation of the virtual environment and/or feature data representing features of landmarks of the virtual environment, for example.

At item 206 of the method 200 of FIG. 2, a common virtual workspace of a VR environment for display of collaborative VR content by the collaborative VR system (in this case, by at least the first and second VR systems) is determined based on the capability data 202 and the environmental data 204. The common virtual workspace for example corresponds to a space within the virtual environment for display of virtual content (such as the collaborative VR content) that is suitable for display by the first and second VR systems, given their display capabilities and their physical environments. The collaborative VR content may be any form of virtual content, e.g. comprising one or more display elements, which is to be viewable by respective users of at least the first and second VR systems. For example, the collaborative VR content may represent a two-dimensional (2D) object (such as a screen for displaying a graphical representation of data) within a three-dimensional (3D) VR environment, or a 3D object within the 3D VR environment.

In one example, the collaborative VR content represents elements of a virtual security operations centre for displaying a graphical representation of security data associated with maintaining a security of a computer system and/or network. Such security data may include or be derived from alerts obtained by intrusion detection and/or response systems, may indicate a status of various computer or network elements or their interactions with each other or other elements, and so forth. In this example, the graphical representation of the security data can be displayed by both the first and second VR systems. The first and/or second VR systems may further provide a suitable control interface to allow respective users to interact with the graphical representation, e.g. so that each user can alter what is being displayed (e.g. which set of a plurality of sets of security data is being displayed) and/or how the graphical representation is displayed (e.g. the format used for displaying particular security data). In this case, a change to the collaborative VR content made by one user is synchronised with the other user, so as to maintain consistency between the collaborative VR content displayed by each of the first and second VR systems. This facilitates collaboration between the users.

At item 208 of FIG. 2, a first layout of at least one display element of the collaborative VR content within the common virtual workspace is determined, for use by the first VR system. Similarly, at item 210 of FIG. 2, a second layout of the at least one display element, within the common virtual workspace is determined, for use by the second VR system. The first and second layouts may be determined within the constraints of the common virtual workspace, i.e. so that the at least one display element of the first and second layouts are each located within the common virtual workspace. The first and second layouts for example indicate the position, orientation and/or scale of the at least one display element, within the common virtual workspace, e.g. so that the at least one display element is optimally viewable by users of the first and second VR systems, respectively.

The first and second layouts may be determined independently or jointly, and may be the same as each other or different from each other. In one example, the first and second layouts are jointly determined based on the capability data 202 and the environmental data 204, e.g. to jointly optimise the position of the at least one display element within the first and second layouts so that it is appropriate for display by each of the first and second VR systems. In a further example, the common virtual workspace, the first layout and the second layout are all jointly determined, based on the capability data 202 and the environmental data 204, as discussed further below with reference to the example methods 300, 500 of FIGS. 3 and 5.

As the common virtual workspace already takes into account the capabilities and environments associated with each of the first and second VR systems, the at least one display element may, in examples, be visible and in an appropriate position irrespective of the exact location in which it is placed within the common virtual workspace, for each of the first and second layouts. The determination of the first and/or second layouts may, however, be further based on at least one characteristic of the collaborative VR system and/or the collaborative VR content itself. For example, the first and second layouts may each be determined (separately or jointly) based on characteristic data indicative of a characteristic of the at least one display element and/or interaction data based on prior user interactions with prior collaborative VR content displayed using the collaborative VR system. Characteristic data may indicate the type of content represented by the at least one display element and/or a property of the content. The interaction data may for example indicate how a user (or a plurality of users) interacted with the prior collaborative VR content (which may have been displayed on the first and/or second VR systems, or at least one other VR system of the collaborative VR system), such as whether the user opted to alter how a display element of the prior collaborative VR content was displayed (e.g. by moving, resizing or changing a display format of the display element), whether the user chose to hide a display element and select a different source of information for display (e.g. so as to instead display a different display element), and so forth. The prior user interactions upon which the interaction data is based may be interactions performed by the same user as a current user of the first and/or second VR systems, and/or interactions performed by a different user, using the first and/or second VR system or a different VR system of the collaborative VR system. Characteristic data and/or interaction data may be stored in a database accessible to the system configured to perform the method 200 of FIG. 2.

In cases such as this, a recommendation system may be used to recommend the first and/or second layouts within the common virtual workspace, based on the characteristic data and/or the interaction data. As the skilled person will appreciate, there are various known recommendation systems that may be adapted for this purpose. Recommendation systems are described for example in "Recommendation systems: Principles, methods and evaluation", by F. O. Isinkaye et. al., which was published in the Egyptian Informatics Journal, Vol. 16, Issue 3, 2015, pp. 26-1-273, the contents of which are incorporated by reference herein. For example, a recommendation system may be based on collaborative filtering, which is based on the principle that a given user will tend to like a layout that is similar to layouts liked by previous users. Collaborative filtering for example relies on rating profiles that represent user layout preferences, e.g. based on prior user interactions, to predict an optimal layout for display of the collaborative VR content. In such cases, the interaction data may represent at least one rating profile obtained based on the prior user interactions. Although collaborative filtering allows appropriate layouts to be predicted, it relies on a large amount of data in order to generate predicted layouts, requires a large amount of computational processing and tends to suffer from a sparsity problem, in that training of the collaborative filtering model is difficult when there is a lack of prior user interactions to learn from, such as when users initially start interacting with the collaborative VR system. The sparsity problem can, however, be addressed by various techniques such as the use of pre-defined templates or matrix factorisation, which relies on various predictions or assumptions to account for a lack of initial training data. An alternative to collaborative filtering is content-based filtering, which is suited to situations in which information about the collaborative VR system and/or the characteristic data is available but in which there is a lack of information about the user and his or her preferences. Content-based filtering hence allows a suitable layout to be predicted given particular device capabilities and/or characteristic data. However, this approach generally requires retraining in order to predict suitable layouts for new devices and/or display elements to be displayed. A further approach is a hybrid recommendation system, which combines both collaborative and content-based filtering approaches to address the drawbacks of each of these approaches used individually. There are various ways in which a hybrid recommendation system can be implemented. For example, collaborative and content-based filtering approaches can be performed separately and then combined, content-based capabilities can be added to a collaborative filtering approach (or vice versa), or collaborative and content-based filtering approaches can be unified into a single model.

In one example in which collaborative filtering is used to determine the first and second layouts 208, 210, the recommendation system obtains interaction data stored in a database accessible to the recommendation system, which in this case is indicative of user ratings of prior layouts (based on prior user interactions with those layouts). The recommendation system also obtains characteristic data, which in this case indicates the nature of the VR content to be displayed. The recommendation system then determines a similarity between the nature of the VR content to be displayed and the nature of prior VR content for which user ratings are available, and uses this as well as the common virtual workspace area to predict the first and second layouts for display of at least one display element of the VR content by the first and second VR systems, respectively.

After the first and second layouts are determined at items 208 and 210 of the method 200, first and second instructions may then be provided to the first and second VR systems to configure the first and second VR systems to use the first and second layouts, respectively. Where the method 200 is performed by a computer system different from the first and second VR systems, the instructions may be provided via a network, such as the network 104 of FIG. 1. In response to receiving the first and second instructions, the first and second VR systems may then use the first and second layouts, respectively, to display the at least one display element of the collaborative VR content. In some cases, though, the first and/or second VR systems may request user confirmation that the user agrees to use the first or second layout, respectively. A particular layout may then be used in response to the user providing confirmation of their agreement with that layout, e.g. via a suitable user interface such as a control interface of the VR system used by the user.

Aspects of the method 200 of FIG. 2 may be performed iteratively to update the collaborative VR content displayed by each of the first and second VR systems. In one example, after providing first and second instructions to the first and second VR systems to display the at least one display element using the first and second layouts, respectively, further display data representative of a further display element of the collaborative VR content is received, e.g. by the system that previously performed the method 200 of FIG. 2, or by another computer system or device, such as one of the first and second VR systems. Items 208 and 210 of the method 200 of FIG. 2 are then repeated for the further display element, in order to determine a further first layout and a further second layout for display of the further display element within the common virtual workspace by the first and second VR systems, respectively. Further first and second instructions can then be provided to the first and second VR systems to configure the first and second VR systems to use the further first layout and the further second layout for display of the further display element, respectively. This may involve configuring the first and second VR systems to request user confirmation of agreement to use the further first layout and the further second layout for the first and second VR systems, respectively.

Figure 3:
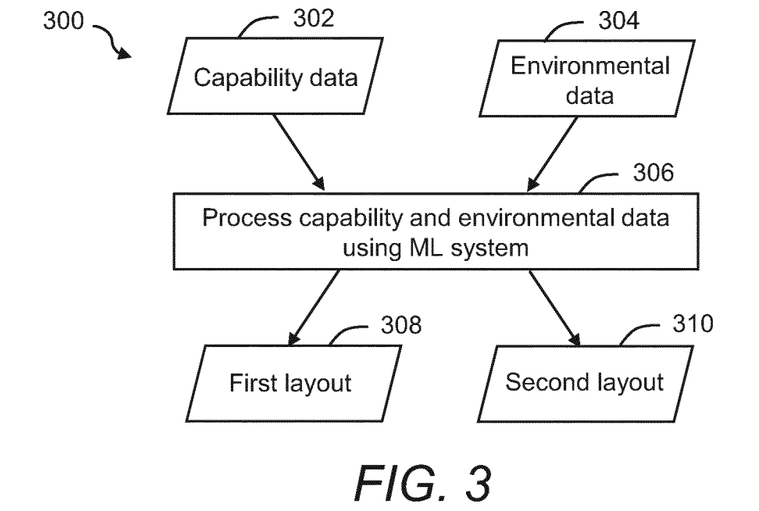
FIG. 3 is a flow diagram of a method for use in configuring a collaborative VR system according to further examples.

FIG. 3 is a flow diagram of a method 300 for use in configuring a collaborative VR system according to further examples. Similarly to the method 200 of FIG. 2, the method 300 of FIG. 3 may be performed by the computer system 106 of FIG. 1 and involves obtaining first and second capability data representative of a display capability of first and second VR systems of the collaborative VR system (shown collectively as capability data 302). The method 300 of FIG. 3 also involves obtaining first and second environmental data representative of at least one characteristic associated with first and second environments of the first and second VR systems, respectively (shown collectively as environmental data 304). The capability data 302 and environmental data 304 of FIG. 3 may be similar to or the same as the capability data 202 and environmental data 204 of FIG. 2, respectively; corresponding descriptions are to be taken to apply.

In FIG. 3, the capability data 302 and the environmental data 304 are processed at item 306 by a trained machine learning (ML) system to generate a first layout 308 of at least one display element within a common virtual environment, for display of the at least one display element by the first VR system, and a second layout 310 of the at least one display element within the common virtual environment, for display of the at least one display element by the second VR system. The ML system for example implements a recommendation system such as those discussed with reference to FIG. 2, which may be based on collaborative filtering, content-based filtering or hybrid filtering approaches, such as model-based collaborative filtering, which may use Bayesian networks in its implementation. In these and other examples, the ML system may utilise ML architectures such as a support vector machine (SVM) and/or an artificial neural network (ANN), as the skilled person will appreciate. An ML model can for example be learned from layout suggestions that are either accepted, modified or rejected by users of the collaborative VR system (or another collaborative VR system). Over time, the ML model can be trained to further weight suggested layouts so that they are tailored either for particular users or an entire population users (e.g. so that layouts with a greater weight are more likely to be output by the ML model). In other words, the ML model can be trained on a per-user or per-population basis. Alternatively, an ML model can be generated from how users of the or another collaborative VR system usually create layouts, irrespective of receiving suggested layouts, which again can be generated or adapted on a per-user or per-population basis.

In this example, the ML system is trained to output layouts for use by respective VR systems to display at least one display element of collaborative VR content. The layouts are each within the common virtual environment. However, although used to determine the layouts, the common virtual environment need not be output by the ML system at item 306. The common virtual environment may instead be determined and used internally, within the ML system, without being output for use by a further component. In other examples, though, the ML system may also output common workspace data representative of the common virtual workspace at item 306 of the method 300, in addition to data representing the first and second layouts 308, 310, respectively, as discussed further with reference to FIG. 5.

As discussed further with reference to the method 200 of FIG. 2, in some examples, the ML system may also receive at least one additional input for use in determining the first and second layouts at item 306. For example, the ML system may further base the determination of the first and second layouts and/or the determination of the common virtual workspace for use in determining the first and second layouts on at least one of: characteristic data as discussed above, interaction data as discussed above, or a number of active (e.g. current) users of the collaborative VR system.

Figure 4:
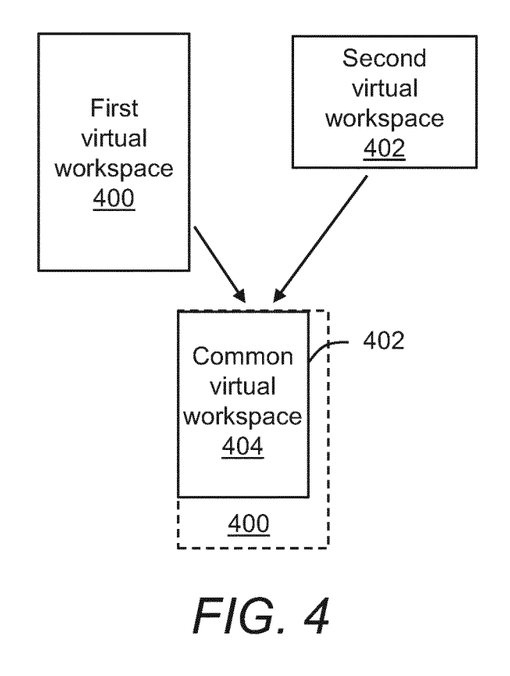
FIG. 4 shows schematically the determination of a common virtual workspace according to examples.

In some examples, the common virtual workspace is determined based on a first and second virtual workspace of the VR environment for display of the collaborative VR content by the first and second VR systems, respectively. FIG. 4 shows schematically the determination of a common virtual workspace in this manner. In FIG. 4, the first virtual workspace 400 is determined based on first environmental data and first capability data and the second virtual workspace 402 is determined based on second environmental data and second capability data. The first and second environmental data are for example similar to or the same as the first and second environmental data described with reference to FIGS. 2 and 3, and the first and second capability data are for example similar to or the same as the first and second capability data described with reference to FIGS. 2 and 3.

The environmental and capability data can for example be used to refine an initial virtual workspace, adjusting the initial virtual workspace so as to obtain a virtual workspace for a VR system, such as the first and second VR systems. The initial virtual workspace may be defined by a user of the VR system, e.g. when they initially set up the VR system for display of VR content. For example, various VR systems, such as the Steam® and Oculus® systems, provide a software development kit (SDK) that provides tools that allow users to indicate a desired workspace, e.g. by "drawing" the workspace within the virtual environment. This initial virtual workspace can then be accessed by other VR applications or systems that have application programming interface (API) calls to the SDK. For example, SteamVR™, which can be used to access VR content using various supported VR headsets and controllers, can be used to store an array of coordinator vectors based on the initial position of a headset. A quadrangle defining a set of bounds can then be entered by a user to indicate the initial virtual workspace they wish to use. This initial virtual workspace can then be refined to account for the constraints represented by the capability data and the environmental data, so it is in accordance with the preferences of the user but nevertheless is appropriate for the capabilities and environment associated with the VR system.

Alternatively, a virtual workspace for a given VR system can be generated based on multiple images of the physical environment of the VR system (which may be represented by the environmental data for that VR system). The images can for example be captured by an image captured device of the VR system. In this way, a 3D virtual workspace can be obtained, e.g. by regressing a truncated signed distance function (TSDF) using a set of images. An example of this approach is described in "Atlas: End-to-End 3D Scene Reconstruction from Posed Images", Murez, Zak, et. al., *ArXiv* abs/2003.10432 (2020), the contents of which are incorporated by reference herein. In these examples, the virtual workspace as generated is further constrained by the capabilities of the VR system (as represented by the capability data) so it is appropriate for display by the VR system.

In general, it is to be appreciated that a virtual workspace such as the first and second virtual workspaces are generated based on the environmental and capability data for the VR system which is to display the virtual workspace. However, the virtual workspace may also be generated based on at least one further constraint, e.g. a geometrical constraint; a size constraint with respect to the limitations of the VR system such as hardware limitations, which may depend on the VR content itself (for example, if the VR content is text-based, the virtual workspace should be relatively small so that VR content displayed anywhere within the virtual workspace is sufficiently close for the user of the VR system to be able to read the text); or a preference-based constraint, to account for preferences of prior users or groups of users (which may be determined e.g. based on prior user interactions).

The first virtual workspace 400 for example corresponds to an active workspace for the first VR system, which can be populated by VR content (in accordance with the display capability of the first VR system) and which is within the bounds of the environment associated with the first VR system, e.g. within the bounds of the physical environment of the first VR system so that a user of the first VR system can interact with VR content within the active workspace without encountering physical objects within the physical environment of the first VR system. The second virtual workspace 402 in this case is the same as the first virtual workspace 400, but for the second VR system rather than the first VR system.

In the example of FIG. 4, the display capabilities of the first and second VR systems are different, as are the first and second environments associated with the first and second VR systems. Due to this, a shape and size of the first virtual workspace 400 differs from a shape and size of the second virtual workspace 402. In FIG. 4, the first and second virtual workspaces 400, 402 are shown as 2D areas for ease of illustration. However, it is to be appreciated that, in other examples, the first and second virtual workspaces correspond to 3D regions within a virtual environment. Furthermore, the first and second virtual workspaces may, in other examples, be the same size and/or shape as each other, e.g. if the first and second VR systems have the same capabilities (e.g. if they are each a different instance of the same type of system) and/or if the first and second VR systems are being used in the same physical or virtual environment as each other, such as the same room.

In FIG. 4, a common virtual workspace 404 is determined based on the first and second virtual workspaces 400, 402. In this example, the common virtual workspace corresponds to an area of overlap between the first and second virtual workspaces 400, 402. This area of overlap can for example be determined by rotating the first and second virtual workspaces 400, 402 to maximise the overlap between the first and second virtual workspaces 400, 402, overlapping the first and second virtual workspaces 400, 402 and calculating the area of overlap. In FIG. 4, the first virtual workspace 400 is longer and thinner than the second virtual workspace 402 in the initial orientation shown in FIG. 4, with a larger overall area. The second virtual workspace 402 in this case is rotated 90 degrees vertically, and then overlapped with the first virtual workspace 400. After rotating the second virtual workspace 402, the second virtual workspace 402 in the rotated orientation is shorter and thinner than the first virtual workspace 400, so that the area of overlap between the first and second virtual workspaces 400, 402 (which corresponds to the common virtual workspace 404) is less than all of the first virtual workspace 400. In other examples, though, the common virtual workspace 404 may correspond to less than all of the second virtual workspace 402 or less than all of both the first and second virtual workspaces 400, 402 (e.g. if there are more than two VR systems in the collaborative VR system, and the common virtual workspace 404 corresponds to an area of overlap between three or more virtual workspaces for display of collaborative VR content by three or more corresponding VR systems).

The common virtual workspace can be determined from the first and second virtual workspaces 400, 402 in various different ways. In one example, a simple geometric approach is used to determine the area of overlap between the first and second virtual workspaces 400, 402 as the common virtual workspace. This approach can be used e.g. if the first and second virtual workspaces 400, 402 are simple, such as rectangular, and can be less computationally expensive than other approaches. Nevertheless, other approaches may be used, e.g. if the first and/or second virtual workspaces 400, 402 have more complex shapes. For example, if the first and second virtual workspaces 400, 402 are irregularly shaped, they can each be divided into a plurality of regular shapes, e.g. using an ML system, from which an area of overlap can then be calculated straightforwardly using geometric techniques. In other examples, an ML system can be used to process data indicative of the first and second virtual workspaces 400, 402 and output data indicative of the common virtual workspace, without first dividing the first and second virtual workspaces 400, 402 into regular shapes. In a further example, an ML system is used to determine both the common virtual workspace and first and second layouts of the VR content within the common virtual workspace, as discussed further below with reference to FIG. 5. In some cases, the common virtual workspace can be determined to provide the best compromise for the users of the collaborative VR system (which may not necessarily be the largest area of overlap between the respective virtual workspaces of each VR system of the collaborative VR system, and which may depend on other policies factors such as the impact on each user of using a particular common virtual workspace). For example, the common virtual workspace may be determined in order to avoid a major impact for one user of the collaborative VR system (e.g. so as to avoid the common virtual workspace appearing as an unduly small area of the available virtual workspace for that user), even if that amounts to providing a less optimal workspace for each of the other users. In another example, the common virtual workspace may be determined to provide an optimal layout for the largest number of users, even if this means that some other users have a sub-optimal layout (e.g. provided the sub-optimal layout still allows the other users to interact satisfactorily with the VR content displayed within the common virtual workspace).

Figure 5:
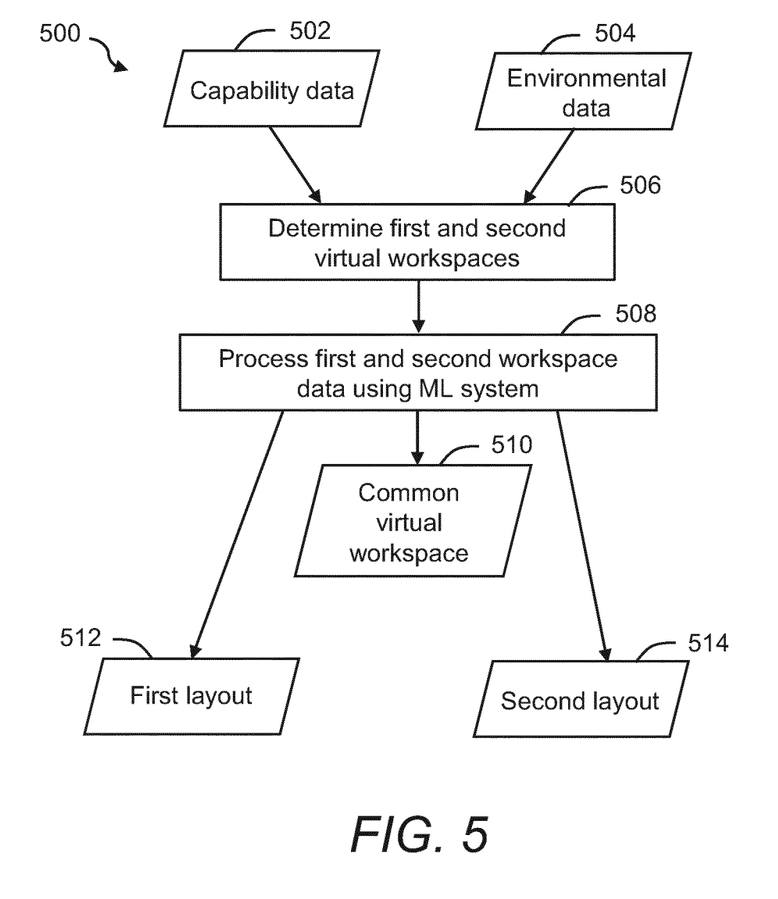
FIG. 5 is a flow diagram of a method for use in configuring a collaborative VR system according to yet further examples.

FIG. 5 is a flow diagram of a method 500 for use in configuring a collaborative VR system according to yet further examples. In the method 500 of FIG. 5, capability data 502 (including first and second capability data for first and second VR systems of the collaborative VR system) and environmental data 504 (including first and second environmental data for the first and second VR systems) are obtained. The capability data 502 and environmental data 504 may be similar to or the same as the capability data 202, 302 and environmental data 204, 304 of FIGS. 2 and 3, respectively; corresponding descriptions are to be taken to apply.

At item 506 of the method 500, first and second virtual workspaces, for display of collaborative VR content by the first and second VR systems respectively, are determined based on the capability data 502 and environmental data 504. The first and second virtual workspaces are for example determined in the same manner or a similar manner to that described with reference to FIG. 4.

At item 508 of the method 500, input data comprising first workspace data representative of the first virtual workspace and second workspace data representative of the second virtual workspace are processed using a trained ML system, to generate output data indicative of the common virtual workspace 510. The ML system used in the method 500 of FIG. 5 may be similar to or the same as the ML system used at item 306 of FIG. 3; a corresponding description is to be taken to apply.

First and second layouts for display of at least one display element of collaborative VR content by the first and second VR systems, within the common virtual workspace 510, can then be determined based on the common virtual workspace 510, as described above with reference to the method 200 of FIG. 2. However, in the method 500 of FIG. 5, the input data processed at item 508 also includes display data indicative of the at least one display element. The display data may be or comprise the characteristic data discussed above, or may instead represent the at least one display element itself rather than a characteristic of the at least one display element. In FIG. 5, the first layout 512 and the second layout 514 are determined by processing the input data using the trained ML system, and the output data output by the trained ML system is also indicative of the first layout 512 and the second layout 514. Hence, in the example of FIG. 5, the output data is indicative of the common virtual workspace 510, the first layout 512 and the second layout 514. The common virtual workspace 510 determined by the trained ML system can then be used in updating layouts to be used by the first and second VR systems, e.g. to determine a suitable layout, within the common virtual workspace 510, for further display elements to be included in the collaborative VR content. It is to be appreciated that the input data may include other data for use by the trained ML system to generate the output data, such as the interaction data, number of active users etc., as explained above with reference to FIG. 3.

Figure 6A:
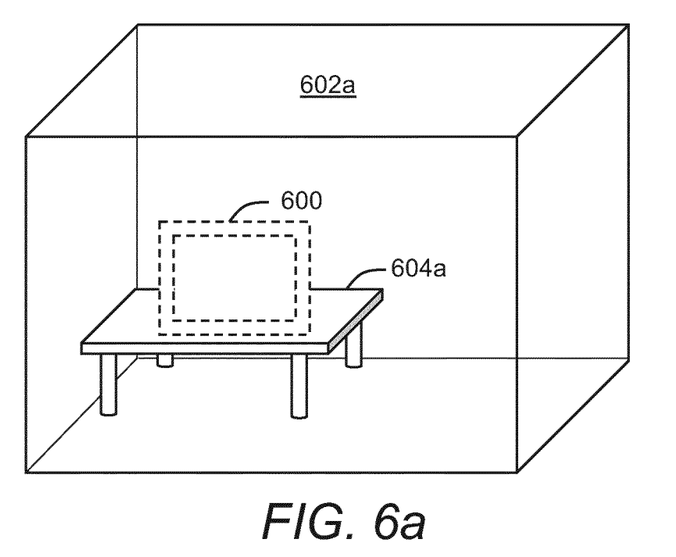
FIG. 6a shows schematically the display of a virtual object with respect to a first physical environment using a first VR system of a collaborative VR system.
Figure 6B:
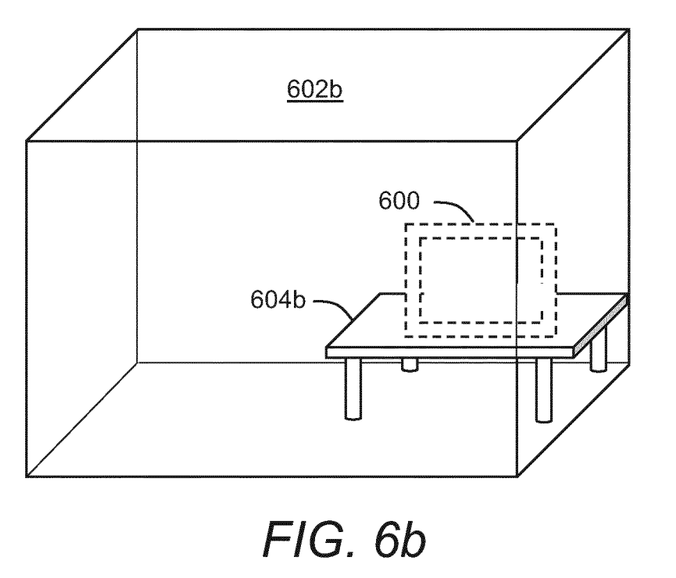
FIG. 6b shows schematically the display of the virtual object of FIG. 6a with respect to a second physical environment using a second VR system of the collaborative VR system of FIG. 6a, according to a first example.
Figure 6C:
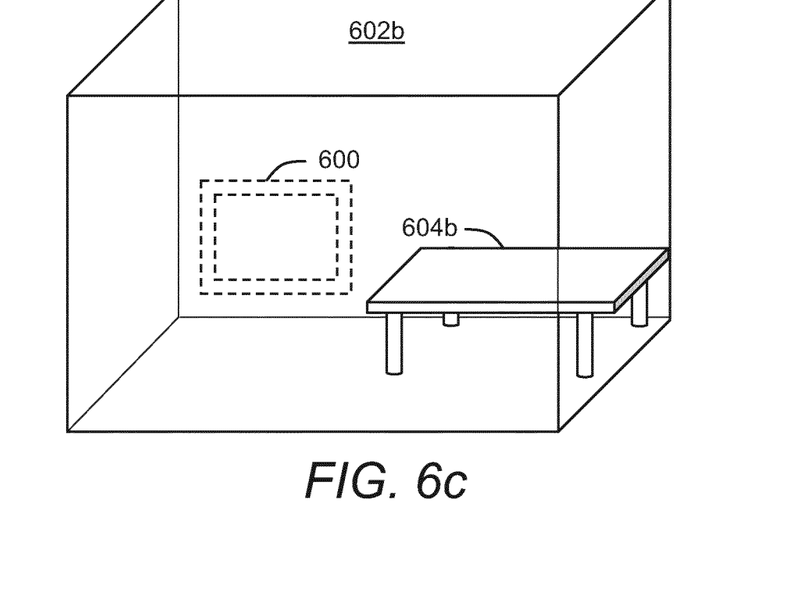
FIG. 6c shows schematically the display of the virtual object of FIGS. 6a and 6b with respect to the second physical environment using the second VR system of FIG. 6b, according to a second example.

To put the previous examples into context, FIGS. 6a to 6c will now be described, which show the display of a virtual object according to various layouts generated using the methods described herein. FIGS. 6a to 6c illustrate examples in which the environmental data is representative of at least one characteristic of a physical environment of each VR system. In this case, the environmental data is indicative of a position of at least one object within the physical environment. In examples such as this, the common virtual workspace can be determined in relation to the position of the at least one object within respective physical environments of each of the VR systems which are to display the collaborative VR content. For example, the common virtual workspace can be determined in relation to a position of at least one object within a first physical environment of the first VR system and a position of at least one object within a second physical environment of the second VR system (which may be the same or different from the at least object within the first physical environment). In this way, the objects within the physical environments can be accounted for in the determination of the common virtual workspace, e.g. so that the common virtual workspace does not coincide with any of the objects.

FIG. 6a shows schematically the display of a virtual object 600 with respect to a first physical environment 602a using a first VR system of a collaborative VR system and FIG. 6b shows schematically the display of the virtual object 600 of FIG. 6a with respect to a second physical environment 602b using a second VR system of the collaborative VR system of FIG. 6a. In FIGS. 6a and 6b, the common virtual workspace is determined based on a first free space area defined in relation to the position of at least one object within the first physical environment 602a (in this case, a first object 604a) and a second free space area defined in relation to the position of at least one further object within the second physical environment 602b (in this case, a second object 604*b*). In this example, the first object 604*a* and the second object 604*b* are both tables, each of which is located in a different position within the first and second physical environments 602*a*, 602*b* (which in FIGS. 6*a* and 6*b* are rooms). However, in other examples, the first and second physical environments may include different objects from each other or, conversely, the first and second physical environments may be the same as each other. The first and second free space areas for example correspond to the respective areas of the first and second physical environments 602*a*, 602*b* which are unoccupied by objects. In the example of FIGS. 6*a* and 6*b*, the first and second free space areas correspond to the areas of each of the rooms other than the areas of the rooms in which the first and second objects 604*a*, 604*b* are located. By determining the common virtual workspace based on the first and second free space areas, the common virtual workspace can for example be determined to correspond to an area of overlap between the first and second free space areas, so that the extent of the common virtual workspace corresponds to free space (e.g. an unoccupied physical region) in both the first and second physical environments 602*a*, 602*b*. With this approach, irrespective of where VR content is located within the common virtual workspace, the VR content will not coincide with objects within either of the first and second physical environments 602*a*, 602*b*. This means that respective users of the first and second VR objects can interact with the displayed VR content safely, without encountering physical objects within either of the first and second physical environments 602*a*, 602*b*.

In some examples, such as those of FIGS. 6*a* and 6*b*, the second object 604*b* of the second physical environment 602*b* corresponds to the first object 604*a* of the first physical environment 602*a*. Two objects may be considered to correspond to each other for example if they are the same type or class of object (e.g. if they are both tables, like in the example of FIGS. 6*a* and 6*b*) even if they are not otherwise identical (e.g. even if they are tables of different heights, designs or shapes). In examples such as this, determining the first layout may include determining a first position of a display element of the VR content to align with a position of the first object 604*a* within the first physical environment 602*a*, and determining the second layout may include determining a second position of the display element to align with a position of the second object 604*b* within the second physical environment 602*b*. This is shown schematically in FIGS. 6*a* and 6*b*, in which the virtual object 600 is aligned with the first object 604*a* in the first physical environment 602*a* and with the second object 604*b* in the second physical environment 602*b*. As can be seen, this means that the first and second layouts of the virtual object 600 are different for display of the virtual object 600 by each of the first and second VR systems. Nevertheless, aligning the virtual object 600 with corresponding objects in each of the first and second physical environments 602*a*, 602*b* can facilitate collaboration between users of the first and second VR systems. For example, the users of the first and second VR systems can locate themselves in corresponding positions with respect to the first and second objects (but in potentially different positions with respect to the first and second physical environments as a whole). In this way, the users can each have a consistent experience in their interaction with the virtual content, and how it relates to corresponding objects within their physical environments. For example, the first and second users may each be seated at corresponding tables (such as the first and second objects 604*a*, 604*b* of FIGS. 6*a* and 6*b*), and may each be able to interact similarly with the virtual object 600 aligned with the corresponding tables, from a seated position. It is to be appreciated that aligning a virtual object with an object in a physical environment for example corresponds to positioning the virtual object relative to the object, e.g. so that the virtual object is within the vicinity of the object (such as within a predetermined distance and/or at a predetermined position from the object). A virtual object may be aligned with a physical object for example so that the virtual object does not coincide with the physical object, e.g. so that a user of a VR system displaying the virtual object can interact with the virtual object without encountering the physical object.

FIG. 6*c* shows schematically a second example of displaying the virtual object 600 of FIGS. 6*a* and 6*b* with respect to the second physical environment 602*b* using the second VR system of FIG. 6*b*. In FIG. 6*c*, rather than aligning the virtual object 600 with the second object 604*b* within the second physical environment 602*b*, the second layout of the virtual object 600 for use by the second VR system is the same as the first layout of the virtual object 600 for use by the first VR system (which first layout is shown in FIG. 6*a*). Hence, the virtual object 600 is located in the same position within the common virtual workspace in the first and second layouts, for display by the first and second VR systems. This can facilitate collaboration between users of the first and second VR systems by presenting the same view to each of the users.

It can hence be seen from FIGS. 6*a* to 6*c* that the approaches described herein are flexible and for example allow the same or different layouts to be presented to respective users, e.g. depending on the nature of the collaborative VR content or how the users desire to use the collaborative VR system. For example, different layouts may be provided to different respective users, in order to improve the viewability of display elements for each user. In other words, the layouts may be optimised in order to provide a subjective and distinctive experience for each user, but with VR content which is nevertheless displayed within the common virtual workspace so as to ensure that each user can readily view and/or interact with the VR content in a safe manner. As an example, two users of two different VR systems may each view a single (virtual) 2D panel of information within a 3D virtual environment. To each user, the 2D panel may appear to face them directly, as the layout of the 2D panel (e.g. the position and orientation of the panel) can be optimised for each user. This can improve the ease with which each user can view and/or interact with the 2D panel compared to using the same compromised position and orientation for each user. In this example, a virtual representation of another user (e.g. an avatar) may be included within the VR content displayed to a given user, so as to represent the other user viewing the 2D panel in an indirect fashion. Actions of the other user can nevertheless be mapped to the personalised view of the given user so that the given user can accurately observe the actions of the other user. For example, if the other user points at the 2D panel, the given user will be able to observe the other user's avatar correspondingly pointing at the 2D panel. It is to be appreciated that this is merely an example, though, and the same principles apply for the display of other VR content using VR systems of a collaborative VR system.

Figure 7:
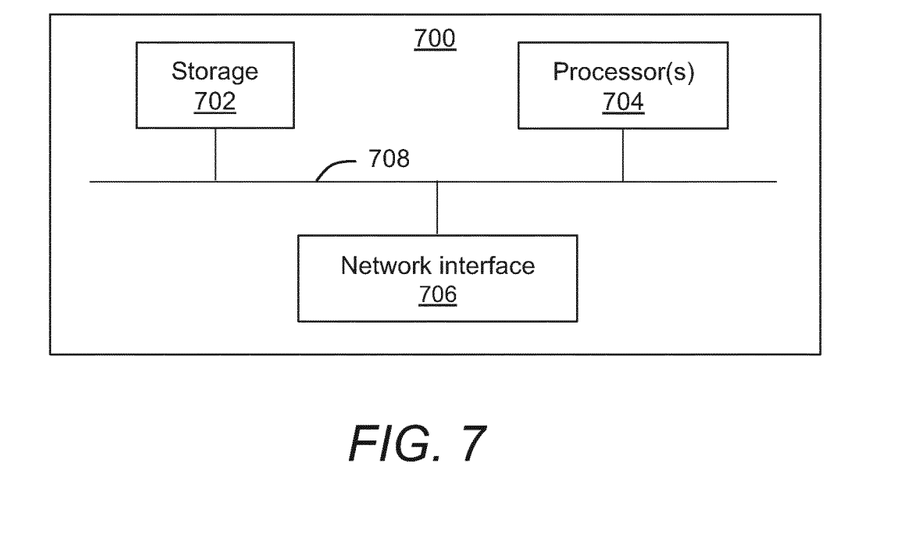
FIG. 7 is a schematic diagram showing internal components of an example processing system.

FIG. 7 is a schematic diagram of internal components of a processing system 700 that may be used in any of the methods described herein. The processing system 700 may include additional components not shown in FIG. 7; only those most relevant to the present disclosure are shown. The processing system 700 may be or form part of a VR system such as the first and second VR systems 102a, 102b of FIG. 1 or a computer system such as the computer system 106 of FIG. 1. The processing system 700 in FIG. 7 is implemented as a single computer device but in other cases a processing system may be implemented as a distributed system.

The processing system 700 includes storage 702 which may be or include volatile or non-volatile memory, read-only memory (ROM), or random access memory (RAM). The storage 702 may additionally or alternatively include a storage device, which may be removable from or integrated within the processing system 700. For example, the storage 702 may include a hard disk drive (which may be an external hard disk drive such as a solid state disk) or a flash drive. The storage 702 is arranged to store data, temporarily or indefinitely. The storage 702 may be referred to as memory, which is to be understood to refer to a single memory or multiple memories operably connected to one another.

The storage 702 may be or include a non-transitory computer-readable medium. A non-transitory computer-readable storage medium includes, but is not limited to, volatile memory, non-volatile memory, magnetic and optical storage devices such as disk drives, magnetic tape, compact discs (CDs), digital versatile discs (DVDs), or other media that are capable of storing code and/or data.

The processing system 700 also includes at least one processor 704, which may be or comprise processor circuitry. The at least one processor 704 is arranged to execute program instructions and process data. The at least one processor 704 may include a plurality of processing units operably connected to one another, including but not limited to a central processing unit (CPU) and/or a graphics processing unit (GPU). For example, the at least one processor 704 may cause any of the methods herein to be implemented upon processing suitable computer program instructions stored in the storage 702.

The processing system 700 further includes a network interface 706 for connecting to at least one network, such as the network 104 of FIG. 1. A processing system otherwise similar to the processing system 700 of FIG. 7 may additionally include at least one further interface for connecting to at least one further component. The components of the processing system 700 are communicably coupled via a suitable bus 708.

Further examples relate to a computer-readable medium storing thereon instructions which, when executed by a computer, cause the computer to carry out the method of any of the examples described herein.

As explained above, examples herein relate to a collaborative VR system including a plurality of VR systems. It is to be appreciated that a VR system as referred to herein is envisaged to be any system with the capability of displaying VR content (e.g. display element(s) within a virtual environment), and for example encompasses mixed reality (MR) systems and extended reality (XR) systems with VR capabilities. MR systems combine augmented reality (AR) and virtual reality (VR) to produce environments in which physical and virtual objects co-exist, e.g. so that real or virtual objects can be added to a virtual environment and virtual objects can be superimposed on real environments. XR systems with VR capabilities for example compass systems with VR capabilities and additionally with AR and/or MR capabilities, e.g. so that a user can switch between a VR mode and an AR and/or MR mode. In examples in which the methods herein are applied to VR systems with additional capabilities than VR, the methods herein may be used to configure the VR systems for displaying VR content, e.g. when in a VR mode.

In FIG. 1, a computer system determines a common virtual workspace, a first layout and a second layout. However, in other examples, a different system, such as one or more of the VR systems of the collaborative VR systems, may instead determine at least one of the common virtual workspace, first layout and second layout. It is hence to be appreciated that obtaining environmental data and capability data and providing instructions to configure a VR system to use a particular layout may be performed within that same VR system. For example, transferring environmental data and capability data from one logical component to another logical component of the VR system may be considered to correspond to obtaining the environmental data and capability data. Similarly, providing instructions from one logical component to another logical component of the VR system may be considered to correspond to providing the instructions. In some examples, one or more of the VR systems may determine at least one of the common virtual workspace, first layout and second layout in a peer-to-peer manner.

In one example discussed with reference to FIG. 2, the collaborative VR content represents a graphical representation of security data. However, it is to be appreciated that the collaborative VR content may represent other types of data in other examples, and the description with reference to FIG. 2 applies equally to these other types of data.

In examples above, first and second layouts are determined for first and second VR systems. However, in other examples, the techniques described herein may be used to determine layouts for more than two VR systems of a collaborative VR system.

In the example of FIGS. 6a to 6c, the environmental data is representative of at least one characteristic of a physical environment of a VR system. In other examples, the environmental data is representative of at least one characteristic of first and second virtual environments to be displayed by first and second VR systems, respectively. In these other examples, the common virtual workspace may similarly be determined in relation to a position of at least one object within the first and second virtual environments, e.g. based on a free space area defined in relation to the position of the of at least one object within the first and second virtual environments. As an example, the common virtual workspace may be defined so that it does not exceed bounds corresponding to virtual walls within the first and second virtual environments. The first and second layouts may similarly be determined based on the positions of the at least one object within the first and second virtual environments, e.g. to align display elements with respective objects within the first and second virtual environments such as virtual tables.

Each feature disclosed herein, and (where appropriate) as part of the claims and drawings may be provided independently or in any appropriate combination. Any apparatus feature may also be provided as a corresponding step of a method, and vice versa.

In general, it is noted herein that while the above describes examples, there are several variations and modifications which may be made to the described examples without departing from the scope of the appended claims. One skilled in the art will recognise modifications to the described examples.

Any reference numerals appearing in the claims are for illustration only and shall not limit the scope of the claims. As used throughout, the word 'or' can be interpreted in the exclusive and/or inclusive sense, unless otherwise specified.

The invention claimed is:

1. A computer-implemented method for use in configuring a collaborative virtual reality (VR) system, the method comprising:
using at least one processor to perform steps of the method including:
obtaining first environmental data representative of at least one characteristic of a first environment associated with a first VR system of the collaborative VR system;
obtaining first capability data representative of a display capability of the first VR system for displaying VR content;
obtaining second environmental data representative of at least one characteristic of a second environment associated with a second VR system of the collaborative VR system;
obtaining second capability data representative of a display capability of the second VR system for displaying VR content;
determining, based on the first environmental data, the second environmental data, the first capability data, and the second capability data, a common virtual workspace of a VR environment for display of collaborative VR content by both the first VR system and the second VR system;
determining a first layout of at least one display element of the collaborative VR content within the common virtual workspace, for use by the first VR system;
determining a second layout of the at least one display element within the common virtual workspace, for use by the second VR system;
providing first instructions to the first VR system to configure the first VR system to use the first layout for the at least one display element; and
providing second instructions to the second VR system to configure the second VR system to use the second layout for the at least one display element.

2. The method of claim 1, wherein the first environment is different from the second environment.

3. The method of claim 1, wherein the first environment is a first physical environment of the first VR system and the second environment is a second physical environment of the second VR system.

4. The method of claim 3, wherein the first environmental data is indicative of a position of at least one object within the first physical environment, the second environmental data is indicative of a position of at least one object within the second physical environment, and determining the common virtual workspace comprises determining the common virtual workspace in relation to the position of the at least one object within the first physical environment and the position of the at least one object within the second physical environment.

5. The method of claim 4, wherein determining the common virtual workspace comprises determining the common virtual workspace based on a first free space area defined in relation to the position of the at least one object within the first physical environment, and a second free space area defined in relation to the position of the at least one further object within the second physical environment.

6. The method of claim 4, wherein the at least one object within the first physical environment comprises a first object, the at least one object within the second physical environment comprises a second object corresponding to the first object, determining the first layout comprises determining a first position of a display element of the at least one display element within the common virtual workspace to align with a position of the first object within the first physical environment and determining the second layout comprises determining a second position of the display element to align with a position of the second object within the second physical environment.

7. The method of claim 1, wherein the first layout and the second layout are jointly determined, based on the first environmental data, the second environmental data, the first capability data, and the second capability data.

8. The method of claim 1, wherein determining the common virtual workspace comprises:
determining, based on the first environmental data and the first capability data, a first virtual workspace of the VR environment for display of the collaborative VR content by the first VR system;
determining, based on the second environmental data and the second capability data, a second virtual workspace of the VR environment for display of the collaborative VR content by the second VR system; and
determining the common virtual workspace based on the first virtual workspace and the second virtual workspace.

9. The method of claim 8, wherein the common virtual workspace corresponds to an area of overlap between the first virtual workspace and the second virtual workspace.

10. The method of claim 9, wherein the common virtual workspace corresponds to at least one of: less than all of the first virtual workspace displayable by the first VR system, and less than all of the second virtual workspace displayable by the second VR system.

11. The method of claim 8, wherein determining the common virtual workspace comprises processing input data comprising first workspace data representative of the first virtual workspace and second workspace data representative of the second virtual workspace using a trained machine learning (ML) system to generate output data indicative of the common virtual workspace.

12. The method of claim 11, wherein the input data comprises display data indicative of the at least one display element, the first layout and the second layout are determined by processing the input data using the trained ML system, and the output data is further indicative of the first layout and the second layout.

13. The method of claim 1, wherein the first capability data is representative of a first field of view of the first VR system for displaying VR content and the second capability data is representative of a second field of view of the second VR system for displaying VR content.

14. The method of claim 1, wherein the first layout is the same as the second layout.

15. The method of claim 1, wherein the first VR system is a different type of VR system than the second VR system.

16. The method of claim 1, wherein determining the first layout comprises determining the first layout based on characteristic data indicative of a characteristic of the at least one display element and determining the second layout comprises determining the second layout based on the characteristic data.

17. The method of claim 1, wherein determining the first layout comprises determining the first layout based on interaction data indicative of prior user interactions with prior collaborative VR content displayed using the collaborative VR system and determining the second layout comprises determining the second layout based on the interaction data.

18. The method of claim 1, comprising:
in response to the first VR system receiving the first instructions, the first VR system using the first layout for the at least one display element; and
in response to the second VR system receiving the second instructions, the second VR system using the second layout for the at least one display element.

19. The method of claim 1, comprising:
after providing the instructions to the first VR system and providing the instructions to the second VR system, receiving further display data representative of a further display element of the collaborative VR content;
determining a further first layout of the further display element within the common virtual workspace, for use by the first VR system; and
determining a further second layout of the further display element within the common virtual workspace, for use by the second VR system;
providing further first instructions to the first VR system to configure the first VR system to use the further first layout for the further display element; and
providing further second instructions to the second VR system to configure the second VR system to use the further second layout for the further display element.

20. A computer system comprising:
at least one processor; and
storage comprising computer program instructions which, when processed by the at least one processor, cause the computer system to:
obtain first environmental data representative of at least one characteristic of a first environment associated with a first VR system of a collaborative VR system;
obtain first capability data representative of a display capability of the first VR system for displaying VR content;
obtain second environmental data representative of at least one characteristic of a second environment associated with a second VR system of the collaborative VR system;
obtain second capability data representative of a display capability of the second VR system for displaying VR content;
determine, based on the first environmental data, the second environmental data, the first capability data, and the second capability data, a common virtual workspace of a VR environment for display of collaborative VR content by both the first VR system and the second VR system;
determine a first layout of at least one display element of the collaborative VR content within the common virtual workspace, for use by the first VR system;
determine a second layout of the at least one display element within the common virtual workspace, for use by the second VR system;
provide first instructions to the first VR system to configure the first VR system to use the first layout for the at least one display element; and
provide second instructions to the second VR system to configure the second VR system to use the second layout for the at least one display element.

21. The computer system of claim 20, wherein the first environmental data and the first capability data are obtained from the first VR system via a network, and the second environmental data and the second capability data are obtained from the second VR system via the network or a further network.

22. The computer system of claim 20, wherein to determine the common virtual workspace, the computer program instructions, when processed by the at least one processor, cause the computer system to:
determine, based on the first environmental data and the first capability data, a first virtual workspace of the VR environment for display of the collaborative VR content by the first VR system;
determine, based on the second environmental data and the second capability data, a second virtual workspace of the VR environment for display of the collaborative VR content by the second VR system; and
determine the common virtual workspace based on the first virtual workspace and the second virtual workspace.

23. The computer system of claim 22, wherein the common virtual workspace corresponds to an area of overlap between the first virtual workspace and the second virtual workspace.

24. The computer system of claim 22, wherein to determine the common virtual workspace, the computer program instructions, when processed by the at least one processor, cause the computer system to process input data comprising first workspace data representative of the first virtual workspace and second workspace data representative of the second virtual workspace using a trained machine learning (ML) system to generate output data indicative of the common virtual workspace.

25. A network comprising the computer system of claim 20, the first VR system and the second VR system.

* * * * *